United States Patent [19]

Jeon

[11] Patent Number: 5,769,392
[45] Date of Patent: Jun. 23, 1998

[54] WATER FLOWRATE CONTROL DEVICE

[76] Inventor: Jyh-Shyong Jeon, No.49-1,Pa-Hsien Rd., Chuan-Yin Village,, Tong-San Hsiang,I-Lan Hsien, Taiwan

[21] Appl. No.: 858,732

[22] Filed: May 19, 1997

Related U.S. Application Data

[63] Continuation-in-part of Ser. No. 491,213, Jun. 16, 1995, abandoned.

[51] Int. Cl.⁶ ................................................. F16K 31/44
[52] U.S. Cl. ...................... 251/221; 251/215; 251/188; 251/192
[58] Field of Search .................................. 251/215, 221, 251/222, 218, 188, 192

[56] References Cited

U.S. PATENT DOCUMENTS

| | | | |
|---|---|---|---|
| 726,214 | 4/1903 | Camus | 251/214 |
| 1,987,135 | 1/1935 | Sugden | 251/221 |
| 2,447,510 | 8/1948 | Langdon | 251/214 |
| 2,805,040 | 9/1957 | Voss | 251/214 |
| 3,523,551 | 8/1970 | Schmitt | 251/214 |
| 3,851,853 | 12/1974 | Teeters | 251/214 |
| 3,871,667 | 3/1975 | Thompson | 251/214 |
| 4,177,971 | 12/1979 | Landamore | 251/214 |
| 4,364,543 | 12/1982 | Soya et al. | 251/221 |
| 4,570,942 | 2/1986 | Diehl et al. | 251/214 |
| 4,601,304 | 7/1986 | Schobl | 251/222 |
| 4,623,119 | 11/1986 | Van der Wiel | 251/188 |

*Primary Examiner*—Denise L. Ferensic
*Assistant Examiner*—Joanne Y. Kim
*Attorney, Agent, or Firm*—Pro-Techtor International Services

[57] ABSTRACT

An improved hydraulic valve comprising a housing having a first coupling end and a second coupling end is provided. The housing includes a receiving recess having an opening atop. The lower section is provided with a cone-shape wall. The inner wall of the middle section defines a plurality of spines, and the upper section having a threaded portion. A controlling tap has a cone-shape body which is provided with an inlet opening and an outlet opening is disposed compactly within the cone-shape wall of the housing. The controlling tap is connected with a stem having a spiral rib in the middle portion. A handle is connected to the top of the stem. A stopping collar having a plurality of spines at the outer peripheral portion is disposed within the middle section of the receiving recess of the housing wherein the spines of the stopping collar can be readily meshed with the spines of middle section of the receiving recess of the housing. The central portion of the collar is provided with a central hole having a spiral portion extending lengthwise. Wherein when the handle is rotated, the spiral rib of the stem can be readily moved along the spiral portion of the stopping collar. And a cover lid having an opening for passing of the stem being provided. The peripheral of the cover lid is provided with a threaded portion which can be engaged with the threaded portion of the upper section of the housing and pressed against to the stopping collar. Wherein when the handle is rotated, the controlling tap can be moved upward or downward.

2 Claims, 3 Drawing Sheets

WATER FLOWRATE CONTROL DEVICE

FIELD OF THE INVENTION

The present invention is a continuation-in-part of the U.S. patent application Ser. No. 08/491,213, entitled to "Water Flow Rate Control Device", filed on Jun. 16, 1995, abandoned.

DESCRIPTION OF PRIOR ART

There are a plurality of valve for controlling the flow of fluid. In the typical configuration, it generally comprises a housing having an inlet and an outlet. A handle having its lower end disposed within the tube and between the inlet and outlet is provided. The handle can be moved between a first position in which the fluid is inhibited to pass and a second position in which the fluid is permitted to pass.

In the conventional faucet, the passage between inlet and outlet is controlled by a tubular stem, however, the matching clearance between the tubular stem and the seat which the housing shall be comparatively accurate otherwise a leakage will be encountered. However, no matter how accurate the tubular stem and the seat of housing is, after a period of service life, both the tubular stem and the seat of housing will be worn such that a leakage will be experienced. This is a common problem and almost all the faucet may experience this troublesome problem during the service life. In case a leakage of fluid is encountered, there is no effective remedy unless the whole faucet is replaced. In light of this, the conventional faucet can be concluded with the following problems, 1) the service life is not long; and 2) replacing a malfunctioned faucet is extremely troublesome and not economic.

SUMMARY OF THE INVENTION

It is the objective of this invention to provide an improved hydraulic valve wherein the above described problems can be completely solved.

According to one aspect of the present invention wherein the improved hydraulic valve is durable and leakage-proof.

BRIEF DESCRIPTION OF DRAWINGS

In order that the present invention may more readily be understood the following description is given, merely by way of example with reference to the accompanying drawings, in which.

DETAILED DESCRIPTION OF PREFERRED EMBODIMENTS

Figure 1:
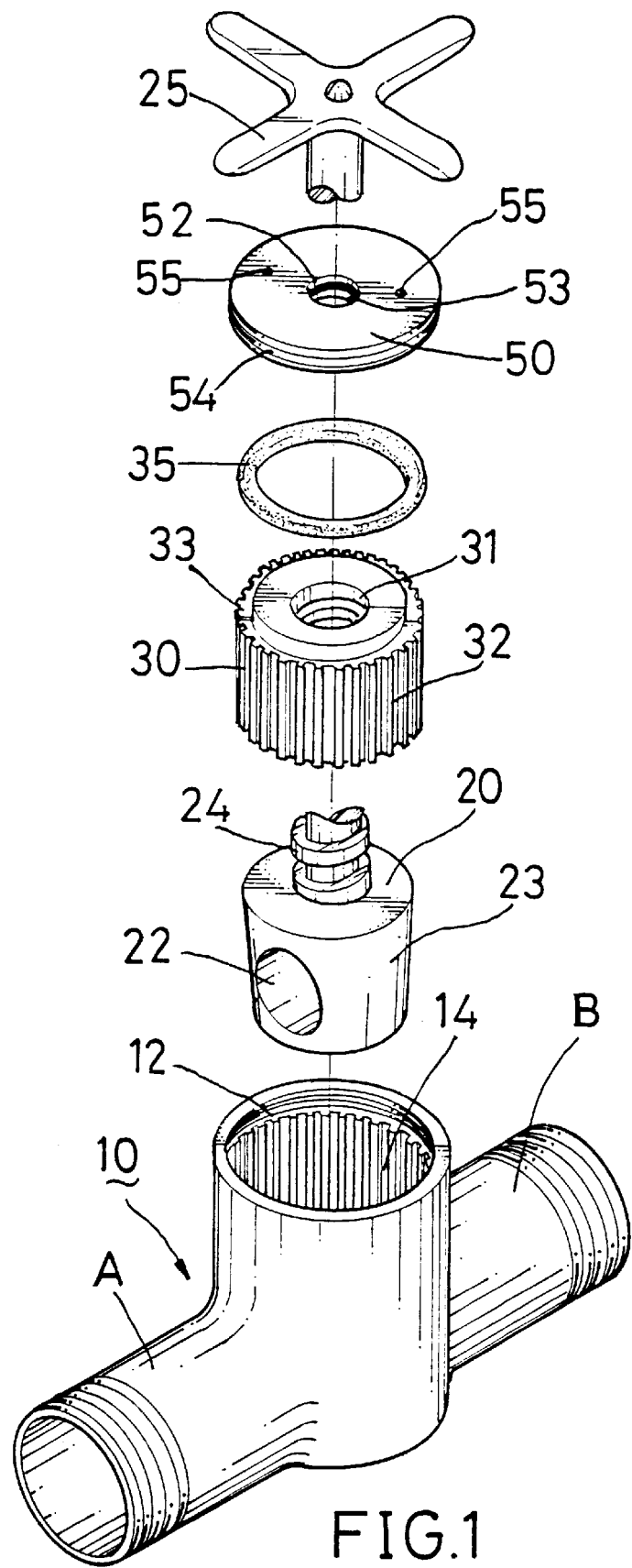
FIG. 1 is an exploded perspective view of the improved hydraulic valve.
Figure 2:
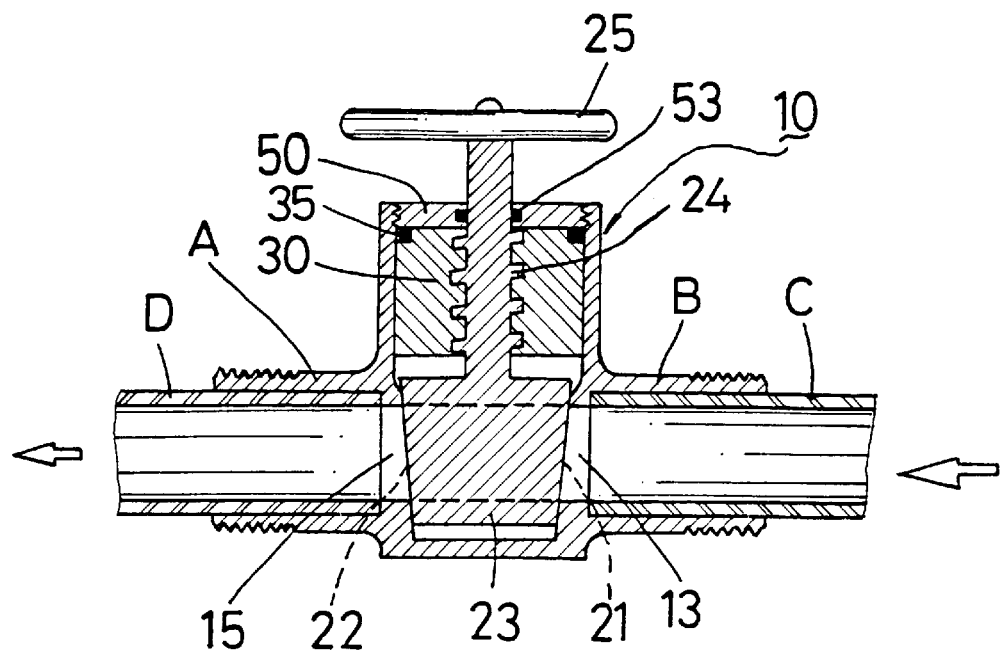
FIG. 2 is a cross sectional view of the improved hydraulic valve.
Figure 3:
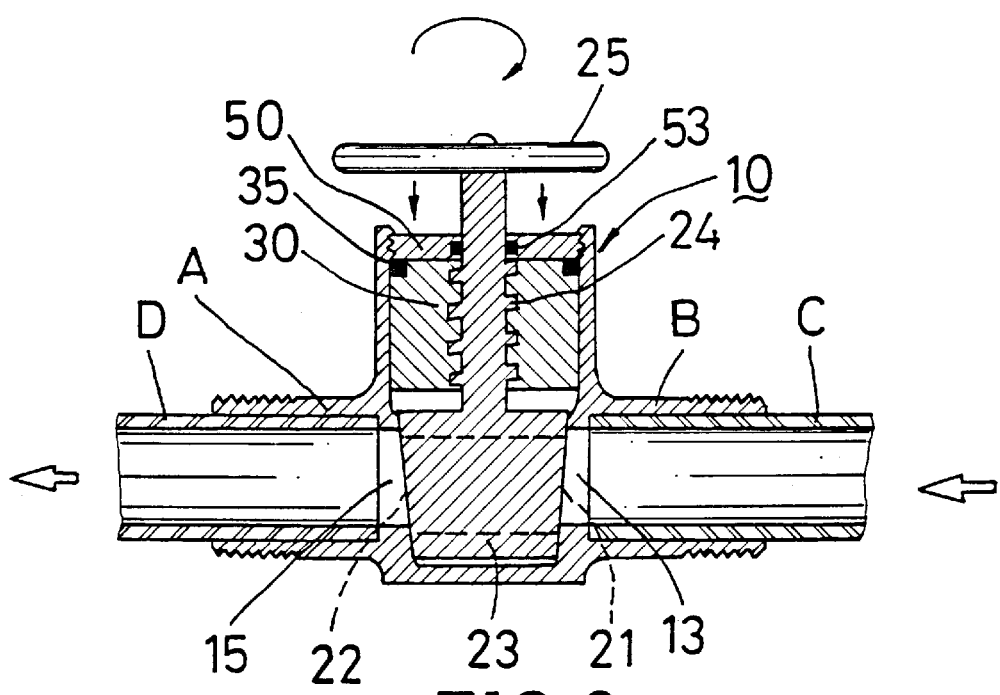
FIG. 3 is a cross sectional view showing a first feasible embodiment.

Referring to FIGS. 1, 2 and 3, the improved hydraulic valve generally comprises a housing 10 having a first coupling end A and a second coupling end B. The housing 10 further includes a receiving recess 101 having an opening atop. The receiving recess 101 can be suitably divided into an upper, a middle and a lower portions. The lower portion has a cone-shape wall 16 and defines an inlet 13 and an outlet 15. The inner wall of the middle section defines a plurality of spine 14 extending vertically (viewed from FIG. 1). The upper section has a threaded portion 12.

A controlling tap 20 having a cone-shape body 23 which has an inlet opening 21 and an outlet opening 22 is provided. The controlling tap 20 can be disposed compactly within the cone-shape wall 16. The controlling tap 20 is connected with a stem 24 having a spiral rib 241 in the middle portion. A handle 25 is further connected to the top of the stem 24.

A stopping collar 30 having a plurality of spines 32 at the outer peripheral portion. The top portion of the collar 30 is defined with a shoulder 33. The spines 32 can be readily meshed with the spines 14 in the middle section of the receiving recess 101 of the housing 10. The central portion of the collar 30 is provided with a central hole 31 having a spiral portion 311 extending lengthwise. By this arrangement, the spiral rib 241 of the stem 24 can be readily screwed into the spiral portion 311. Accordingly, when the stem 24 is rotated by the handle 25, the tap 20 can be rotated. The shoulder 33 of the collar 30 is further provided with a sealing ring 35.

A cover lid 50 having an opening 52 which has a sealing ring 53 thereof at the central portion is provided. The peripheral of the cover lid 50 is provided with threaded portion 54 which can be engaged with the threaded portion 12 of the upper section of the housing 10. The top surface of the cover lid 50 is further provided with a pair of actuating recesses 55 for being driven by a suitable tool.

The present invention can be concluded with the following advantages and which be described as follow.

1. Referring to FIGS. 2 and 3, the coupling ends A and B can be connected to an inlet pipe C and an outlet pipe D. The coupling ends A and B are provided with threaded portion and it can be also connected to a pipe having inner threaded portion at end portion. However, the pipe can be also inserted into the coupling ends A and B if the outer diameter of the pipe equals to the inner diameter of the coupling ends A and B. In this case, suitable adhesive agent can be applied to the outer surface and inner surface of the pipe and the coupling ends.

2. The cone-shape body 23 of the controlling tap 20 has an interference fit to the cone-shape wall 16 such that no clearance is established therebetween. When the handle 25 is rotated clockwise, the spiral rib 241 of the stem 24 of the controlling tap 20 will be moved downward along the spiral portion 311 of the stopping collar 30 which is stationary within the central hole 31. When the cone-shape body 23 is moved to the lower dead point, the cone shape body 23 may establish a comparatively compact and sealed engagement with the cone-shape wall 16. In this case, the inlet and outlet openings 21 and 22 are offset from the inlet and outlet 13 and 15 and are sealed by the cone-shape wall 16. When the handle 25 is rotated counterclockwise, the controlling tap 20 together the cone-shape body 23 is moved and lifted such that the inlet and outlet openings 21 and 22 are aligned with the inlet and outlet 13 and 15 and a fluid communication between the inlet 13 and outlet 15 is established. Accordingly, the fluid from pipe C can flows to the pipe D.

However, in case after a period of service life, the cone shape body 23 is worn and a leakage may be found. Then the cover lid 50 can be rotated a little more downward as guided by the threaded portion 14 in the upper section of the housing 10 such that the stopping collar 30 can be moved downward. When the stopping collar 30 is moved downward, the stem 24 which is rotationally engaged with the stopping collar 30 by the spiral rib 241 and the spiral portion 311 is moved downward, consequently, a sealed engagement between the cone shape body 23 and the cone-shape wall 16 is attained again as the wearing between the cone-shape body 23 and the cone-shape wall 16 is compensated by the downward movement of the cone-shape body 23, as clearly shown in FIGS. 2 and 3. In this case, when a wearing is found on both cone shape body 23 and the cone-shape wall 16, the wearing can be compensated by moving the lower dead point downward. In light of this, the service life is prolonged without replacing the valve.

Figure 4:
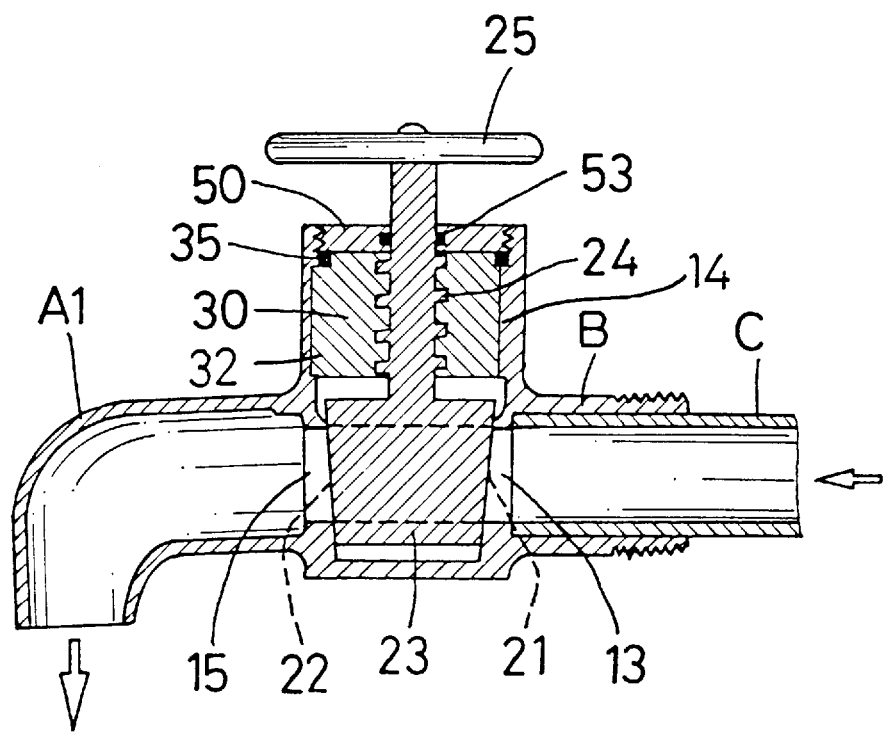
FIG. 4 is still a cross sectional view showing a second feasible embodiment.

FIG. 4 discloses another embodiment made according to the present invention. The coupling end A can be designed into a faucet A1 and it can be directly installed on an outlet of water supply.

I claim:

1. An improved hydraulic valve comprising a housing having a first coupling end and a second coupling end, said housing including a receiving recess having an opening atop, the lower section being provided with a cone-shape wall, the inner wall of the middle section defining a plurality of spine, and the upper section having a threaded portion;

a controlling tap having a cone-shape body which is provided with an inlet opening and an outlet opening, being disposed compactly within said cone-shape wall of said housing, said cone-shape body being connected with a stem having a spiral rib in the middle portion, a handle being connected to the top of said stem;

a stopping collar having a plurality of spines at the outer peripheral portion, being disposed within said middle section of said receiving recess of said housing wherein said spines of said stopping collar can be readily meshed with the spines of middle section of said receiving recess of said housing, the central portion of said collar being provided with a central hole having a spiral portion extending lengthwise, wherein when said handle is rotated, said spiral rib of said stem can be readily moved along said spiral portion of said stopping collar; and a cover lid having an opening for passing of said stem being provided, the peripheral of said cover lid being provided with a threaded portion which can be engaged with the threaded portion of said upper section of said housing and pressed against to said stopping collar, wherein when said handle is rotated, said controlling tap can be moved upward or downward.

2. An improved fluid valve as recited in claim 1, wherein the top surface of said cover lid being provided with a pair of actuating recesses.

* * * * *